3,321,468
NOVEL 2H-1,5-BENZODIAZEPIN-2-ONES
John Krapcho, Somerset, and Chester Turk, Elizabeth, N.J., assignors, by mesne assignments, to E. R. Squibb & Sons Inc., New York, N.Y., a corporation of Delaware
No Drawing. Filed Mar. 9, 1965, Ser. No. 438,420
11 Claims. (Cl. 260—239.3)

This invention relates to new chemical compounds having valuable therapeutic properties and processes for the preparation thereof.

The therapeutically active compounds of this invention are bases of the Formula I:

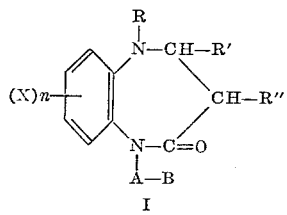

and acid-addition salts thereof, wherein X is hydrogen, lower alkyl, lower alkoxy, benzyloxy, lower alkylmercapto, nitro, di(lower alkyl)amino, halo or trifluoromethyl; R is acyl; R' and R" are each hydrogen, lower alkyl, cycloalkyl, X-substituted phenyl, furyl, thienyl, or pyridyl; n is one, two or three; A is lower alkylene (preferably ethylene and propylene); and B is a basic nitrogen-containing radical of less than twelve carbon atoms.

Among the suitable radicals represented by the symbol B are: amino; (lower alkyl)amino (e.g., methylamino); di(lower alkyl)amino (e.g., diethylamino, dimethylamino, and N-methyl-N-propylamino); (hydroxy-lower alkyl)amino; di(hydroxy-lower alkyl)amino; phenyl (lower alkyl)amino (e.g., benzylamino; N-phenyl(lower alkyl)-N-(lower alkyl)amino (e.g., N-phenethyl-N-methylamino); and saturated 5 to 7 membered monocyclic heterocyclic radicals of less than twelve carbon atoms, as exemplified by piperidino; (lower alkyl)piperidino; di(lower alkyl)piperidino; (lower alkoxy)piperidino, 2, 3 or 4-piperidyl; 2, 3 or 4-(N-lower alkyl)piperidyl; homopiperidino; pyrrolidino; (lower alkyl)pyrrolidino; di(lower alkyl)pyrrolidino; (lower alkoxy)pyrrolidino; 2 or 3-pyrrolidyl; 2 or 3-(N-lower alkyl-pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; homopiperazino; (lower alkyl)piperazino (e.g., N⁴ - methylpiperazino); di(lower alkyl)piperazino; (lower alkoxy)piperazino; hydroxy-lower alkyl-piperazino [e.g., N⁴-(2-hydroxyethyl)piperazino]; lower alkanoyloxy - lower alkyl-piperazino [e.g., N⁴-(2 - acetoxyethyl)piperazino]; X-substituted phenyl piperazino [e.g., N⁴ - (o - methoxyphenyl)piperazino]; X-substituted phenyl(lower alkyl)piperazino (e.g., N⁴-phenethylpiperazino); X - substituted cinnamyl piperazino; and N⁴-pyridyl piperazino [e.g., N⁴-(2-pyridyl)piperazino].

Among the suitable radicals represented by the symbol R are: X-substituted alkanoyls (e.g., acetyl, propionyl, trifluoromethylacetyl, hexanoyl, methoxyacetyl, methylmercaptoacetyl, nitroacetyl, dimethylaminoacetyl, chloroacetyl, bromoacetyl, iodoacetyl and fluoroacetyl), X-substituted alkenoyls (e.g., 3-butenoyl), X-substituted alkadienoyl (e.g., sorbyl), X-substituted alkinoyls (e.g., propioloyl), cycloalkanoyl (e.g., cyclopropanecarbonyl and cyclohexanecarbonyl), X-substituted aralkanoyls (e.g., phenacetyl and β-phenylpropionyl), X-substituted aralkenoyls (e.g., cinnamoyl), X-substituted aralkinoyls (e.g., phenylpropiolyl), X-substituted aroyls (e.g., benzoyl, 2-methoxybenzoyl, furoyl, thenoyl, nicotinoyl and naphthoyl), carbamyl, dialkylcarbamyls (e.g., dimethylcarbamyl and diethylcarbamyl), cycloalkylcarbamyls, piperidylcarbamyl, lower alkane sulfonyls (e.g., methane sulfonyl) and X-substituted aryl sulfonyl (e.g., benzenesulfonyl and 4-chlorobenzenesulfonyl).

The terms "lower alkyl," "lower alkoxy," "lower alkylene," and "lower alkonyl," as employed herein include both straight and branched chain radicals of less than eight carbon atoms.

The preferred compounds are those wherein X is hydrogen or halo, R is the acyl radical of a hydrocarbon carboxylic acid of less than twelve carbon atoms, R' is X-substituted phenyl, R" is hydrogen, A is ethylene or propylene, and B is di(lower alkyl)amino. Particularly preferred are those compounds wherein X is hydrogen or chloro, R is lower alkanoyl, R' is phenyl, R" is hydrogen, A is ethylene or propylene, and B is di(lower alkyl)amino.

As to salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids, such as maleic, methane sulfonic, cyclohexane sulfamic, tartaric, citric, acetic and succinic acid, theophylline and 8-chlorotheophylline.

The compounds of this invention, including the acid-addition salts thereof, are therapeutically active substances which are useful as tranquilizers and thus can be administered perorally or parenterally, for example, in the same manner as chlordiazepoxide in the treatment of irrational fears, anxiety and tension, the dosage for such treatment being adjusted for the activity of the particular compound employed.

The compounds of this invention can be prepared by condensing a compound of the Formula II:

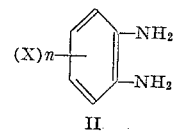

wherein X and n are as hereinbefore defined, with a compound of the Formula III:

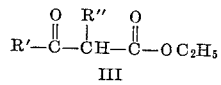

wherein R' and R" are as hereinbefore defined, to yield intermediates of the Formula IV:

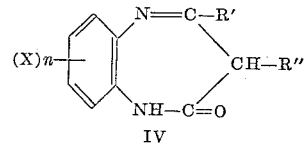

wherein X, n, R' and R" are as hereinbefore defined.

These intermediates IV are then reduced, as by treatment with hydrogen in the presence of a hydrogenation catalyst such as palladium, to yield intermediates of the Formula V:

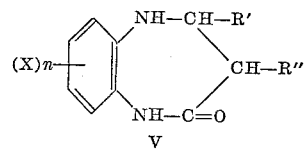

wherein X, n, R' and R" are as hereinbefore defined.

These intermediates V are then treated with an acylating agent, such as the acid anhydride or acyl chloride of one of the acids mentioned hereinbefore, to yield intermediates of the Formula VI:

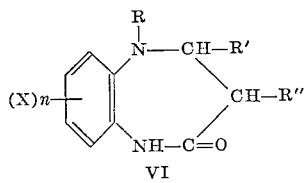

wherein X, n, R, R' and R" are as hereinbefore defined.

Finally, these intermediates VI are treated with an aminoalkyl halide of the formula: B—A—(halo), wherein A and B are as hereinbefore defined to yield the final products of this invention. The acid-addition salts or free bases initially formed can be converted to free bases or acid-addition salts, respectively, in the usual manner.

Alternatively, the final products can be prepared by treating a compound of Formula IV with the aminoalkyl halide to yield intermediates of the Formula VII:

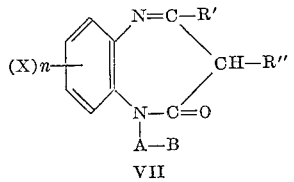

wherein X, n, R', R", A and B are as hereinbefore defined. These intermediates VII are then reduced to yield intermediates of the Formula VIII:

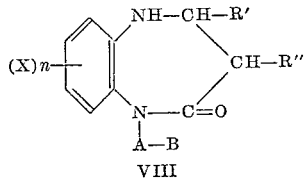

wherein X, n, R', R", A and B are as hereinbefore defined, and then treated with the acylating agent to yield the final products.

Among the suitable starting materials of Formula II can be mentioned:

o-aminoaniline;
(lower alkyl)-o-aminoanilines,
such as o-methyl-o-aminoaniline,
p-ethyl-o-aminoaniline,
m-isopropyl-o-aminoaniline,
p-n-hexyl-o-aminoaniline,
and o,m-dimethyl-o-aminoaniline;
(lower alkoxy)-o-aminoanilines,
such as o-methoxy-o-aminoaniline,
p-ethoxy-o-aminoaniline,
and m-n-butoxy-o-aminoaniline;
(lower alkylmercapto)-o-aminoanilines,
such as p-methylmercapto-o-aminoaniline;
nitro-o-aminoanilines,
such as m-nitro-o-aminoaniline;
di(lower alkyl)-amino-o-aminoanilines,
such as p-dimethylamino-o-aminoaniline;
halo-o-aminoanilines,
such as p-chloro-o-aminoaniline,
o,p-dichloro-o-aminoaniline and
o-chloro-p-methyl-o-aminoaniline; and
trifluoromethyl-o-aminoanilines,
such as p-trifluoromethyl-o-aminoaniline.

Among the starting materials of Formula III can be mentioned the ethyl esters of: (lower alkanoyl)acetic acids, such as formylacetic acid, acetylacetic acid, propionylacetic acid and hexanoylacetic acid; cycloalkylcarbonylacetic acids, such as cyclopentanecarbonylacetic acid and cyclohexanecarbonylacetic acid; X-substituted benzoylacetic acids, such as benzoylacetic acid,
p-chlorobenzoylacetic acid,
o-methylbenzoylacetic acid,
m-methoxybenzoylacetic acid,
m-nitrobenzoylacetic acid,
p-dimethylaminobenzoylacetic acid and
m-trifluoromethylbenzoylacetic acid;
furoylacetic acid;
thienoylacetic acid;
nicotinoylacetic acid;

and corresponding compounds wherein one of the hydrogen atoms on the acetic acid moiety is replaced by a lower alkyl, cycloalkyl, X-substituted phenyl, furyl, thienyl or pyridyl radical.

The following examples illustrate the invention (all temperatures being in centigrade):

EXAMPLE 1.—5-ACETYL-1-(2-DIMETHYLAMINOETHYL) - 1,3,4,5 - TETRAHYDRO - 4 - PHENYL-2H - 1,5 - BENZODIAZEPIN - 2 - ONE, HYDROCHLORIDE (A) *Preparation of 1,3-dihydro-4-phenyl-2H-1,5-benzodiazepin-2-one*

1,3 - dihydro - 4 - phenyl - 2H - 1,5 - benzodiazepin - 2-one is prepared by interaction of o-phenylenediamine with ethyl benzoylacetate in xylene according to the procedure described in Ber. 90, 831 (1957). The material is crystallized from dimethyl-formamide-acetonitrile, M.P. about 204–206°.

(B) *Preparation of 1,3,4,5-tetrahydro-4-phenyl-2H-1,5-benzodiazepin-2-one*

A suspension of 30 g. of material from part (A) in 250 ml. of acetic acid is treated with 3 g. of 5% palladium-carbon and the mixture placed under a pressure of 50 pounds of hydrogen. The theoretical quantity of hydrogen is consumed in about 1 hour. The catalyst is filtered, the filtrate is evaporated under reduced pressure, and the residue added to 100 ml. of cold water to give about 25 g. of solid, M.P. about 159–162°. After crystallization from 140 ml. of acetonitrile, the product weighs about 21.2 g., M.P. about 163–165°.

(C) *Preparation of 5-acetyl-1,3,4,5-tetrahydro-4-phenyl-2H-1,5-benzodiazepin-2-one*

A mixture of 18.5 g. of material from part (B)) and 40 ml. of acetic anhydride is refluxed for 5 minutes and the hot solution added to 400 ml. of water. After standing overnight, the solid is filtered, washed with water and air-dried on a porous plate; wt. about 16.0 g., M.P. about 175–180°. Crystallization from 100 ml. of acetonitrile gives about 9.9 g. of colorless product, M.P. about 200–202°.

(D) *Preparation of 5-acetyl-1-(2-dimethylaminoethyl)-1,3,4,5 - tetrahydro - 4 - phenyl - 2H - 1,5 - benzodiazepin-2-one, hydrochloride*

A suspension of 9.8 g. of material from part (C) in 100 ml. of toluene is added to a slurry of 1.4 g. of sodamide in 100 ml. of toluene and the mixture heated at 50° for 30 minutes. After cooling to room temperature, the resulting solution is treated with a solution of about 5.5 g. of 2-dimethylaminoethyl bromide in 100 ml. of toluene. This mixture is stirred for 30 minutes at room temperature, refluxed for 4 hours, cooled and extracted with dilute hydrochloric acid. The aqueous phase is basified with sodium hydroxide solution and the liberated base extracted with ether. The ether extracts are combined, dried over magnesium sulfate and filtered. Evaporation of the solvent yields a residue which is triturated with hexane to give about 7.6 g. of solid, M.P. about 132–134°. This material is dissolved in 50 ml. of ethanol and treated with 4.5 ml. of 5.9 N alcoholic hydrogen chloride. The resulting solution is diluted to 200 ml. with ether to give about 7.5 g. of solid, M.P. about 238–240°. After crystallization from 50 ml. of isopropyl alcohol, the colorless solid weighs about 6.2 g., M.P. about 238–240°.

EXAMPLE 2.—5 - PROPIONYL - 1 - (2 - DIMETHYL-AMINOETHYL) - 1,3,4,5 - TETRAHYDRO - 4 - PHENYL - 5 - PROPIONYL - 2H - 1,5 - BENZODIAZEPIN-2-ONE, HYDROCHLORIDE (A) *Preparation of 1,3,4,5-tetrahydro-4-phenyl-5-propionyl-2H,1,5-benzodiazepin-2-one*

A solution of 35.0 g. of material from part (B) of Example 1 and 15.3 g. of triethylamine in 400 ml. of chloroform is added dropwise to a cooled solution (10°) of 14.0 g. of propionyl chloride in 100 ml. of chloroform. The resulting mixture is stirred for 1 hour, refluxed for 1 hour, cooled and then extracted with 100 ml. portions of water (5 times). The organic phase is dried over magnesium sulfate, filtered and the filtrate concentrated under reduced pressure to about 100 ml. The residue is diluted with 300 ml. of hexane to give about 36.3 g. of product which melts at about 205–208°. Crystallization from 400 ml. of acetonitrile gives about 25.0 g. of colorless product, M.P. about 224–226°.

(B) *Preparation of 1-(2-dimethylaminoethyl)-1,3,4,5-tetrahydro - 4 - phenyl - 5 - propionyl - 2H - 1,5 - benzodiazepin-2-one, hydrochloride*

Interaction of 20.0 g. of material from part (A) of Example 2 with 2.7 g. of sodamide and 9.7 g. of 2-dimethylaminoethyl chloride in toluene according to the procedure of part (D) of Example 1, there is obtained about 16.0 g. of base, M.P. about 122–125°. Crystallization from 60 ml. benzene-160 ml. of hexane gives about 12.5 g. of product, M.P. about 123–125°. This material gives about 12.2 g. of the hydrochloric salt, M.P. about 225–228°. Crystallization from 200 ml. of isopropyl alcohol gives about 10.2 g. of colorless product, M.P. about 226–228°.

Similarly, by following the procedure of Example 1, but substituting the indicated acyl chloride for the acetic anhydride in part (C), the designated 5-R-1-(2-dimethylaminoethyl) - 1,3,4,5 - tetrahydro - 4 - phenyl - 2H - 1,5 - benzodiazepin-2-one hydrochloride is formed:

| Ex. | Reactant | Product: R is— |
|---|---|---|
| 3 | Trifluoroacetyl chloride | Trifluoroacetyl. |
| 4 | Methoxyacetyl chloride | Methoxyacetyl. |
| 5 | Methylmercaptoacetyl chloride | Methylmercaptoacetyl. |
| 6 | Nitroacetyl chloride | Nitroacetyl. |
| 7 | Dimethylaminoacetyl chloride | Dimethylaminoacetyl. |
| 8 | Chloroacetyl chloride | Chloroacetyl. |
| 9 | 3-butenoyl chloride | 3-butenoyl. |
| 10 | Sorboyl chloride | Sorboyl. |
| 11 | Propioloyl chloride | Propioloyl. |
| 12 | Cyclohexanecarbonyl chloride | Cyclohexanecarbonyl. |
| 13 | Phenacetyl chloride | Phenacetyl. |
| 14 | Cinnamoyl chloride | Cinnamoyl. |
| 15 | Benzoyl chloride | Benzoyl. |
| 16 | 2-methoxybenzoyl chloride | 2-methoxybenzoyl. |
| 17 | Furoyl chloride | Furoyl. |
| 18 | Thenoyl chloride | Thenoyl. |
| 19 | Nicotinoyl chloride | Nicotinoyl. |
| 20 | Naphthoyl chloride | Naphthoyl. |
| 21 | Carbamyl chloride | Carbamyl. |
| 22 | Dimethylcarbamyl chloride | Dimethylcarbamyl. |
| 23 | Piperidylcarbamyl chloride | Piperidylcarbamyl. |
| 24 | Methanesulfonyl chloride | Methanesulfonyl. |
| 25 | Benzenesulfonyl chloride | Benzenesulfonyl. |
| 26 | 4-chlorobenzenesulfonyl chloride | 4-chlorobenzenesulfonyl. |

EXAMPLE 27.—7 - CHLORO - 5 - ACETYL - 1 - (2-DIMETHYLAMINOETHYL) - 1,3,4,5 - TETRAHYDRO - 4 - PHENYL - 2H - 1,5 - BENZODIAZEPIN-2-ONE, HYDROCHLORIDE

Following the procedure of Example 1, but substituting 2-amino-5-chloroaniline for the o-phenylenediamine in part (A), there is obtained 7-chloro-5-acetyl-1-(2-dimethylaminoethyl) - 1,3,4,5 - tetrahydro - 4 - phenyl - 2H - 1,5-benzodiazepin-2-one hydrochloride.

Similarly, by following the procedure of Example 1, but substituting the indicated X-substituted-o-phenylenediamine for the o-phenylenediamine in part (A), the designated X-substituted-5-acetyl-1-(2-dimethylaminoethyl)-1,3,4,5 - tetrahydro - 4 - phenyl - 2H - 1,5 - benzodiazepin-2-one hydrochloride is formed:

| Example | Reactant: X is— | Product: X is— |
|---|---|---|
| 28 | o-Methyl | 6-methyl. |
| 29 | p-Ethyl | 8-ethyl. |
| 30 | o-Methoxy | 6-methoxy. |
| 31 | m-n-Butoxy | 7-n-butoxy. |
| 32 | p-Methylmercapto | 8-methylmercapto. |
| 33 | m-Nitro | 7-nitro. |
| 34 | p-Dimethylamino | 8-dimethylamino. |
| 35 | p-Trifluoromethyl | 8-trifluoromethyl. |

EXAMPLE 36.—5-ACETYL-1-(2-DIMETHYLAMINOETHYL) - 1,3,4,5 - TETRAHYDRO - 2H - 1,5 - BENZODIAZEPIN-2-ONE, HYDROCHLORIDE

Following the procedure of Example 1, but substituting ethyl formylacetate for the ethyl benzoylacetate in part (A), there is obtained 5-acetyl-1-(2-dimethylaminoethyl)-1,3,4,5-tetrahydro-2H-1,5-benzodiazepin-2-one hydrochloride.

Similarly, by following the procedure of Example 1, but substituting the indicated ethyl R'-substituted-acetate for the ethyl benzoylacetate in part (A), there is obtained the designated 4-R'-substituted-5-acetyl-1-(2-dimethylaminoethyl) - 1,3,4,5 - tetrahydro - 2H - 1,5 - benzodiazepin-2-one hydrochloride:

| Example | Reactant: R' is— | Product: R' is— |
|---|---|---|
| 37 | Acetyl | Acetyl. |
| 38 | Hexanoyl | Hexanoyl. |
| 39 | Cyclopentanecarbonyl | Cyclopentanecarbonyl. |
| 40 | p-Chlorobenzoyl | p-Chlorobenzoyl. |
| 41 | o-Methylbenzoyl | o-Methylbenzoyl. |
| 42 | m-Methoxybenzoyl | m-Methoxybenzoyl. |
| 43 | m-Nitrobenzoyl | m-Nitrobenzoyl. |
| 44 | p-Dimethylaminobenzoyl | p-Dimethylaminobenzoyl. |
| 45 | m-Trifluoromethylbenzoyl | m-Trifluoromethylbenzoyl. |
| 46 | Furoyl | Furoyl. |
| 47 | Thienoyl | Thienoyl. |
| 48 | Nicotinoyl | Nicotinoyl. |

EXAMPLE 49.—3 - METHYL - 5 - ACETYL - 1 - (2-DIMETHYLAMINOETHYL) - 1,3,4,5 - TETRAHYDRO - 4 - PHENYL - 2H - 1,5 - BENZODIAZEPIN-2-ONE, HYDROCHLORIDE

Following the procedure of Example 1, but substituting ethyl 2-benzoylpropionate for the ethyl benzoylacetate in part (A), there is obtained 3-methyl-5-acetyl-1-(2-dimethylaminoethyl) - 1,3,4,5 - tetrahydro - 4 - phenyl - 2H - 1,5-benzodiazepin-2-one hydrochloride.

Similarly, by following the procedure of Example 1, but substituting the indicated ethyl α-R''-substituted benzoylacetate for the ethyl benzoylacetate in part (A), there is obtained the designated 3-R''-5-acetyl-1-(2-dimethylaminoethyl) - 1,3,4,5 - tetrahydro - 4 - phenyl - 2H - 1,5-benzodiazepin-2-one hydrochloride:

| Example | Reactant: R'' is— | Product: R'' is— |
|---|---|---|
| 50 | Cyclohexyl | Cyclohexyl. |
| 51 | Phenyl | Phenyl. |
| 52 | p-Chlorophenyl | p-Chlorophenyl. |
| 53 | Furyl | Furyl. |
| 54 | Thienyl | Thienyl. |
| 55 | 4-pyridyl | 4-pyridyl. |

The invention may be variously otherwise embodied within the scope of the appended claims.

What is claimed is:
1. A compound selected from the group consisting of bases of the formula

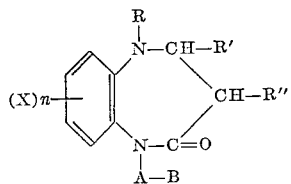

and pharmaceutically-acceptable acid-addition salts thereof, wherein X is selected from the group consisting of hydrogen, lower alkyl, lower alkoxy, benzyloxy, lower alkylmercapto, nitro, di(lower alkyl)amino, halo and trifluoromethyl; $n$ is a positive integer less than four; R is selected from the group consisting of the acyl radical of a hydrocarbon carboxylic acid of less than twelve carbon atoms, lower alkane sulfonyl and X-phenylsulfonyl; R' and R'' are each selected from the group consisting of hydrogen, lower alkyl, cycloalkyl of less than seven carbon atoms, X-substituted phenyl, furyl, thienyl and pyridyl; A is lower alkylene; and B is selected from the group consisting of amino, (lower alkyl)amino, di(lower alkyl)-amino, (hydroxy-lower alkyl) amino, di(hydroxy-lower alkyl)amino, phenyl(lower alkyl)amino, N-(lower alkyl)-N-phenyl(lower alkyl)amino, piperidino, (lower alkyl)-piperidino, di(lower alkyl)piperidino, (lower alkoxy)piperidino, homopiperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)-thiamorpholino, (lower alkoxy)thiamorpholino, piperazino, (lower alkyl)piperazino, di(lower alkyl)piperazino, (lower alkoxy)piperazino, lower alkanoyloxy-lower alkyl-piperazino, X-substituted phenyl piperazino, X-substituted phenyl(lower alkyl)piperazino, X-substituted cinnamyl piperazino and pyridyl piperazino.

2. 5(lower alkanoyl)-1-[di(lower alkyl)amino(lower alkyl)]1,3,4,5 - tetrahydro - 4 - phenyl - 2H - 1,5 - benzodiazepin-2-one.

3. A pharmaceutically-acceptable acid-addition salt of the compound of claim 2.

4. 5 - acetyl - 1 - (2 - dimethylaminoethyl) - 1,3,4,5-tetrahydro-4-phenyl-2H-1,5-benzodiazepin-2-one.

5. A pharmaceutically-acceptable acid-addition salt of the compound of claim 4.

6. The hydrochloride salt of the compound of claim 4.

7. 5 - propionyl - 1 - (2 - dimethylaminoethyl) - 1,3,4,5-tetrahydro-4-phenyl-2H-1,5-benzodiazepin-2-one.

8. A pharmaceutically-acceptable acid-addition salt of the compound of claim 7.

9. A compound of the formula

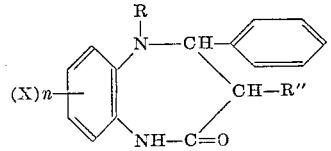

wherein X is selected from the group consisting of hydrogen, lower alkyl, lower alkoxy, benzyloxy, lower alkylmercapto, nitro, di(lower alkyl)amino, halo and trifluoromethyl; $n$ is a positive integer less than four; R is selected from the group consisting of the acyl radical of a hydrocarbon carboxylic acid of less than twelve carbon atoms, lower alkane sulfonyl and X-phenylsulfonyl; and R'' is selected from the group consisting of hydrogen, lower alkyl, cycloalkyl of less than seven carbon atoms, X-substituted phenyl, furyl, thienyl and pyridyl.

10. 5 - acetyl - 1,3,4,5 - tetrahydro - 4 - phenyl - 2H-1,5-benzodiazepin-2-one.

11. 5 - propionyl - 1,3,4,5 - tetrahydro - 4 - phenyl - 2H-1,5-benzodiazepin-2-one.

References Cited by the Examiner
UNITED STATES PATENTS
2,957,867  10/1960  Werner _____ 260—239.3

WALTER A. MODANCE, *Primary Examiner.*
JOHN D. RANDOLPH, *Examiner.*
ROBERT T. BOND, *Assistant Examiner.*